(12) United States Patent
Chavez et al.

(10) Patent No.: US 12,523,798 B2
(45) Date of Patent: Jan. 13, 2026

(54) MEANS FOR SUPPORTING WIRELESS FRESNEL LENS OVER A MOBILE DEVICE TO ENHANCE ANTENNAE RECEPTION OF RF SIGNALS

(71) Applicant: ORC TECH, LLC, Albuquerque, NM (US)

(72) Inventors: John Chavez, Albuquerque, NM (US); Luis M Ortiz, Albuquerque, NM (US)

(73) Assignee: ORC TECH, LLC, Albuquerque, NM (US)

( * ) Notice: Subject to any disclaimer, the term of this patent is extended or adjusted under 35 U.S.C. 154(b) by 232 days.

(21) Appl. No.: 18/236,756

(22) Filed: Aug. 22, 2023

(65) Prior Publication Data
US 2024/0085594 A1    Mar. 14, 2024

Related U.S. Application Data

(60) Provisional application No. 63/400,673, filed on Aug. 24, 2022.

(51) Int. Cl.
*G02B 3/08* (2006.01)
*A45F 5/10* (2006.01)
*H04B 1/3877* (2015.01)

(52) U.S. Cl.
CPC .......... *G02B 3/08* (2013.01); *A45F 5/10* (2013.01); *H04B 1/3877* (2013.01); *A45F 2005/1006* (2013.01)

(58) Field of Classification Search
CPC ...... G02B 3/08; A45F 5/10; A45F 2005/1006; H04B 1/3877
See application file for complete search history.

(56) References Cited

U.S. PATENT DOCUMENTS

| | | | |
|---|---|---|---|
| 12,238,233 B1 * | 2/2025 | Durfee, Jr. .......... | H04M 1/0281 |
| 2012/0081265 A1 * | 4/2012 | Kennedy .................. | H01Q 1/08 343/909 |
| 2015/0087244 A1 * | 3/2015 | Hu .................... | G08B 13/19658 455/74.1 |

* cited by examiner

*Primary Examiner* — James C. Jones
(74) *Attorney, Agent, or Firm* — KPPB Law; Luis M. Ortiz; Kermit D. Lopez (57) ABSTRACT

A Fresnel lens is adapted to be attached to a button associated with an expandable grip structure for a mobile device. The expandable grip structure can include a collapsible membrane formable into a conical shaped when expanded from a flat position to an expanded position, the button formed at one end of the collapsible membrane and having an outer perimeter and a surface, and a base formed at a second end of the collapsible membrane. The collapsible membrane can be expanded and moved by the base along a back surface of a mobile device to a location on the back surface that enables the Fresnel lens to enhance radio frequency reception by the mobile device.

15 Claims, 8 Drawing Sheets

MEANS FOR SUPPORTING WIRELESS FRESNEL LENS OVER A MOBILE DEVICE TO ENHANCE ANTENNAE RECEPTION OF RF SIGNALS

INVENTION PRIORITY

The present application claims priority as a continuation of Provisional Patent Application No. 63/400,673, filed Aug. 24, 2022, entitled "Means For Supporting Wireless Fresnel Lens Over A Mobile Device To Enhance Antennae Reception Of RF Signals", which is herein incorporated by reference in its entirety.

TECHNICAL FIELD

The embodiments described herein are generally related to systems and methods for enhancing wireless communications by improving wireless gain. More particularly, the embodiments are related to an accessory for supporting a wireless Fresnel lens as a signal enhancement over a mobile device to improve reception of radio frequency signals transmitted from wireless communications equipment including.

BACKGROUND

In U.S. Pat. No. 8,384,614 B1 ("614 patent"), issued Feb. 26, 2013, National Aeronautics and Space Administration (NASA) inventors disclosed a means to address the need for improved signal communications systems and for an improved Fresnel lens to increase the signal to noise ratio (SNR) ratio in wireless communication links, thereby improving the range and performance of wireless devices. The '614 patent details how to solve address these needs using an improved Fresnel lens, which basically utilizes concepts of a Fresnel lens and incorporate them for use between wireless communications transmitters and receivers as an antenna enhancement to pass wanted signals while suppressing or eliminating unwanted signals. The '614 patent in incorporated herein by reference in its entirety for its teaching.

NASA inventors found that portable, wireless communication devices often require an increased SNR. The need can arise from increased range, higher data rates, and compromised channels—e.g., RF interference and rain fade. Increased SNR can also be required in urban environments because of urban blockage, either on foot or in an automobile, where buildings and materials cause exacerbated fading conditions. Natural disasters can further diminish the operational effectiveness of traditional methods of communication thereby creating a need for increased SNR. For example, hurricanes and earthquakes can damage transmission links, such as mobile phone towers, requiring an increased range of communication for remaining undamaged communication links to maintain geographic coverage. Highly critical government communication applications can also require increased SNR. Individuals, such as boaters, hunters, campers, or stranded motorists, would benefit from an increase in the SNR of their wireless portable communication devices, such as radios, pagers, and mobile phones.

Despite the brilliant teachings of the '614 patent, a need still exists for improved means to effectively support the deployment of Fresnel lenses as an antenna transmission/receiving enhancement and improve the effectiveness of communications equipment, and thereby also improving the range and performance of wireless portable electronic devices.

SUMMARY OF THE EMBODIMENTS

An apparatus and method for supporting a Fresnel lens over a mobile device, with the Fresnel lens operating as a passive enhancement for antennas associated with electronic communications devices and enhancing the gain of wireless signals by mobile device antennas, is described.

In a first embodiment, a Fresnel lens can be provided that is adapted to be attached to a button associated with an expandable grip structure for a mobile device. The expandable grip structure can include a collapsible membrane formable into a conical shaped when expanded from a flat position to an expanded position, the button formed at one end of the collapsible membrane and having an outer perimeter and a surface, and a base formed at a second end of the collapsible membrane. The collapsible membrane can be expanded and moved by the base along a back surface of a mobile device to a location on the back surface that enables the Fresnel lens to enhance radio frequency reception by the mobile device.

In accordance with another embodiment, a Fresnel lens-enhanced expandable grip structure for use with mobile devices can be provided that includes a collapsible membrane, a button formed at one end of the collapsible membrane, a base formed at a second end of the collapsible membrane and a Fresnel lens disposed on the outer perimeter and surface of the button. The collapsible membrane can be formed into a conical shaped when expanded from a flat position to an expanded position. The base can be moved along and attached to a backside of a mobile device and the collapsible membrane expanded to enable the Fresnel lens to enhance radio frequency reception by the mobile device.

In accordance with another embodiment, a suction cup can be attached to an outer surface of the base. The suction cup can be adapted for attachment to the back surface of the mobile device to thereby affix the Fresnel lens at select locations over the back surface of the mobile device.

In accordance with another embodiment, the base can include a slidable clip. The slidable clip can be adapted to attach to and slide along slots formed in sides of a mobile device protective cover to thereby move the Fresnel lens over the back surface of the mobile device.

In accordance with another embodiment, the Fresnel lens can further include an adhesive backside. The adhesive backside can be adapted to attach the Fresnel lens to a surface of the button.

In accordance with another embodiment, the Fresnel lens can further include a carrier. The carrier can be adapted to attach to at least one of the button or expandable membrane.

In accordance with another embodiment, a combination of expanding the collapsible membrane and movement of the expandable grip structure and the Fresnel lens along the back surface of a mobile device can enable finding a location on the back surface that provides improved signal reception from transceivers with respect to an internal antenna associated with the mobile device.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

A detailed description will now be provided. Each of the appended claims defines a distinct embodiment of the invention, which for infringement purposes is recognized as including equivalents to the various elements or limitations specified in the claims. Depending on the context, all references below to the "invention" may in some cases refer to certain specific embodiments only. In other cases, it will be recognized that references to the "invention" will refer to subject matter recited in one or more, but not necessarily all, of the claims. Each of the embodiments will now be described in greater detail below, including specific embodiments, versions and examples, but the inventions are not limited to these embodiments, versions or examples, which are included to enable a person having ordinary skill in the art to make and use the inventions when the information in this patent is combined with available information and technology.

Figure 7:
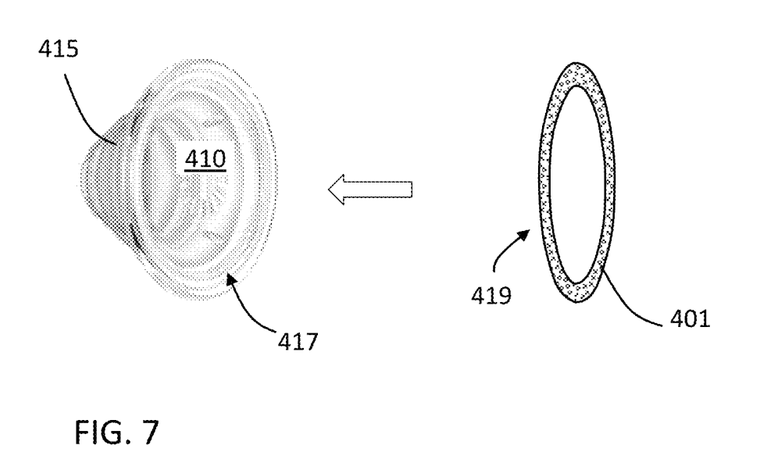
FIG. 7 depicts a Fresnel lens adapted for attachment to a button integrated with a collapsible membrane, according to one or more embodiments described.
Figure 8:
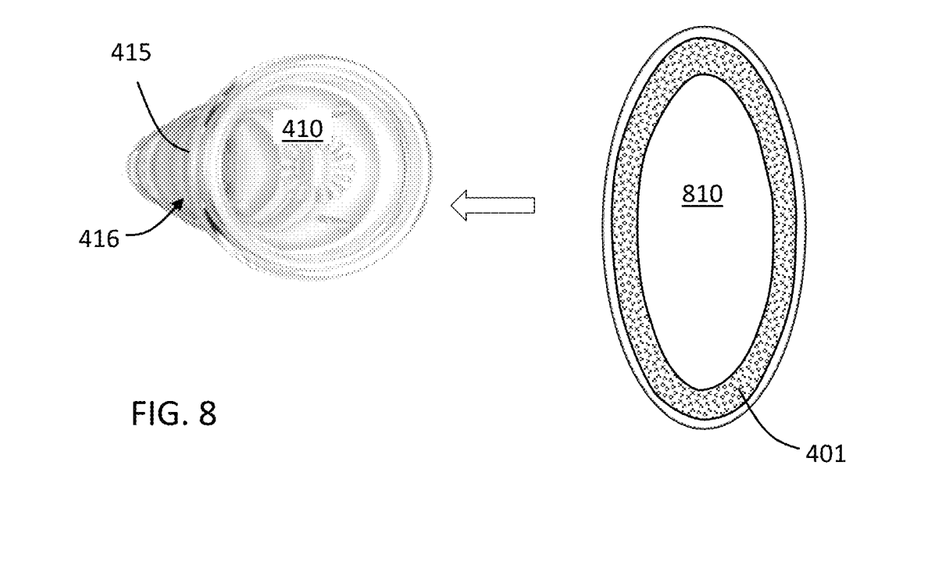
FIG. 8 further depicts a Fresnel lens adapted for attachment to a button integrated with a collapsible membrane, according to one or more embodiments described.

Reference to "Fresnel lens" throughout this detailed description should be interpreted to refer to a passive enhancement for antennas associated with electronic communications devices and enhancing the gain of wireless signals received by the antennas, such as the Fresnel lens taught by the '614 patent, which is hereby incorporated by reference for its teaching. FIGS. 1-7 provide background on the Fresnel lens and its operation. FIGS. 8-10 describe improvements for effective deployment and use of the Fresnel lens, in accordance with one or more of the embodiments of the invention.

Figure 1:
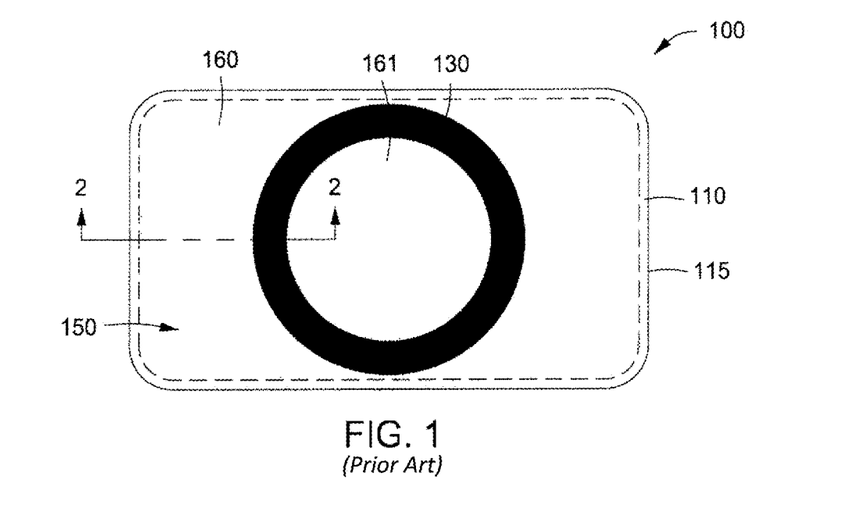
FIG. 1, labeled as prior art, depicts a side view of an illustrative Fresnel lens.

Referring to FIG. 1, labeled as prior art, depicted is a front view of an illustrative Fresnel lens or Fresnel zone plate 100. As used herein, the term "lens" can refer to any three-dimensional structure, through which electromagnetic waves can pass and that uses either refraction or diffraction to control the exiting aperture distribution as a function of its position and shape. As used herein, the terms "Fresnel lens" or "Fresnel zone plate" can refer to a type of lens that produces focusing and imaging of electromagnetic waves using diffraction, rather than refraction. It is noted that a lens and hence, a Fresnel lens, are not antennas. An antenna is a transducer that transmits or receives electromagnetic waves. Conversely, a Fresnel lens does not transmit or receive electromagnetic waves. A Fresnel lens operates more like a filter when it comes to wireless electromagnetic waves. As stated above and as will be discussed in more detail supra, electromagnetic waves are passed through a Fresnel lens wherein said electromagnetic waves may be focused into Fresnel zone regions.

The Fresnel lens 100 can include one or more screens 150. As used herein, the term "screen" refers to a monolithic body, sheet, or membrane having a thickness that is less than its length and width. The screen 150 can have any shape or combination of geometrical shapes. The shape of the screen 150 can be symmetric or asymmetric. Illustrative shapes can include, but are not limited to, square, rectangular, triangular, circular, elliptical, pentagonal, hexagonal, other polygonal shapes, non-uniform shapes, or a combination thereof. The screen 150 shown in FIG. 1 is rectangular, which has a length longer than its width, a width longer than its length. If provided in the form of a square, the width and length can be equal. The screen 150 in this prior art Fresnel lens is formed of a deformable and/or flexible material or fabric. As used herein, the term "deformable" refers to the ability of the material or fabric to twist, bend, flex, turn, and/or change shape. The screen 150 can have one or more electrically conductive regions 130 and one or more non-conductive regions (two are shown 160, 161). The one or more electrically conductive regions 130 can be disposed adjacent to at least one of the non-conductive regions 160, 161. The one or more electrically conductive regions 130 is shown as a ring shaped conductive region disposed between an inner non-conductive region 161 and an outer non-conductive region 160. As used herein, the term "conductive" is used interchangeably with the term "electrically conductive." The electrically conductive region 130 can be formed by disposing an electrically conductive material or layer on a surface of the screen 150, attaching the electrically conductive material or layer to the surface of the screen 150, embedding the electrically conductive material at least partially within the screen 150, or any combination thereof.

The outer non-conductive region 160 and the inner non-conductive region 161 can be formed by disposing a non-conductive material or layer on the surface of the screen 150, attaching a non-conductive or insulating material to the surface of the screen 150, embedding the non-conductive material at least partially within the screen 150, or any combination thereof, where the screen 150 is non-conductive. Alternatively, the outer non-conductive region 160 and the inner non-conductive region 161 can be or can include the portion of the screen 150 that does not include the electrically conductive region 130.

The electrically conductive material used in the electrically conductive region 130 can be made of or include an electrically conductive fabric, which can include any kind of electronic textile or "e-textile". E-textiles can include any textile that can be applied to the physical manipulation of electrical or electromagnetic signals or radiation; most often, this is associated with devices that incorporate one or more electronic devices. Electronic textiles can provide several advantages for portable Fresnel lenses and applications thereof. Electronic textiles are often lightweight with low mass. In addition, they can be both foldable and flexible. E-textiles may be constructed from materials that are resistant to the elements and/or extreme environments. For example, NOMEX®, having excellent thermal, chemical, and radiation resistance, can be used as a base nonconductive e-textile material element. As such, when electrically conductive region 130 includes e-textiles, the Fresnel lens 100 can be lightweight, low mass, foldable, flexible, and/or resistant to the elements. Metals that can be used in the construction of electronic textiles can include, but are not limited to, copper, nickel, gold, silver, steal, zinc, tin, tungsten, iron, iridium, aluminum, alloys thereof, or other conductive elements. Metalized fiber strands can include polymers coated with metal. Other conducting fabric strands can include electrically conducting polymers or plastics. Electronic textiles can include multiple metalized fibers wrapped together to form electrically conductive strands. Electronic textiles can include nano-tubes or other nanoparticles that have advanced electronic function. In another embodiment, the electrically conductive region 130 can be made using metal meshes, such as a copper wire or gold wire mesh.

The conductivity of the electrically conductive region 130 and conductivity of the non-conductive region 160 can be reversed. For example, the electrically conductive region 130 can be a non-conductive region made of non-conductive fabric, and the non-conductive regions 160, 161 can be conductive regions made of all or mostly conductive fabric. The non-conductive regions can also be the same material with the conductive region affixed near the center of the material defining the non-conductive regions after its placement.

Figure 2:
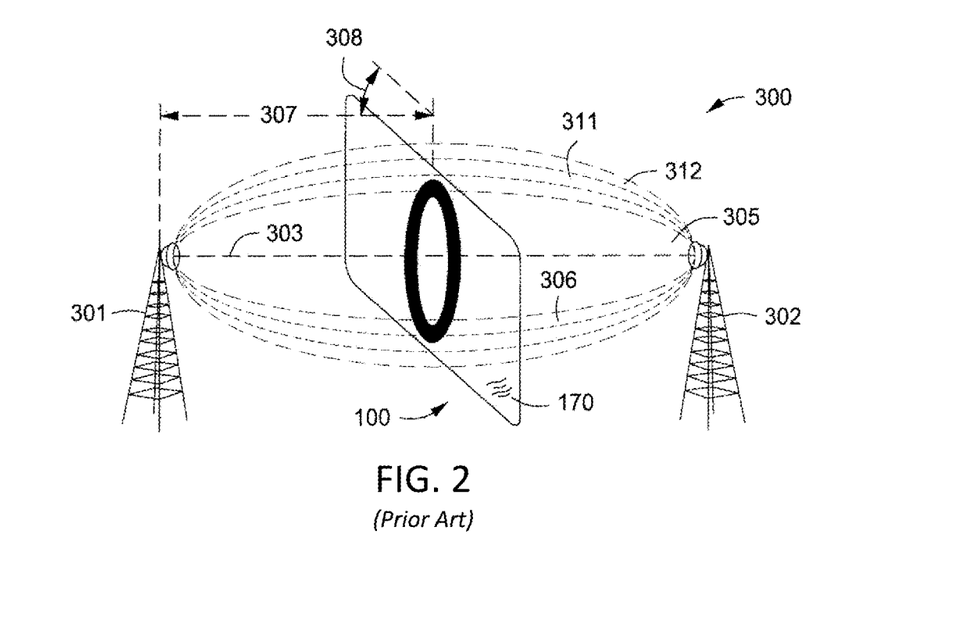
FIG. 2, labeled as prior art, depicts a schematic diagram of an illustrative communication link utilizing the Fresnel lens depicted in FIG. 1.

FIG. 2, labeled as prior art, depicts a schematic diagram of an illustrative communication link 300 utilizing the Fresnel lens 100 depicted in FIG. 1, according to one or more embodiments.

The communication link 300 can include both a transmitting or transmission source 301 and a receiver 302, with a transmission path 303 formed therebetween. In operation, the Fresnel lens 100 through its one or more screens can cancel or block at least a portion of an out-of-phase radiated field produced by the transmission source 301, at any instant of time, passing through a planar cut that is orthogonal to the transmission path 303. The cancellation of the out-of-phase radiation can be accomplished by insertion of the electrically conductive region 130 of the Fresnel lens' 100 one or more screens, such that it blocks or covers one or more Fresnel zone regions (four Fresnel zone regions are shown 305, 306, 311, 312) at a predetermined distance 307 from the transmission source 301 in the transmission path 303. The shape and location of four Fresnel zone regions are depicted diagrammatically as 305, 306, 311, and 312. Fresnel zones are inherent to all wireless communication links. Any transmission from a source or transmitter, such as the transmission source 301, can produce both in-phase and out-of-phase radiation defined by Fresnel zones. Fresnel zones can be concentric ellipsoids of revolution that define volumes of in-phase and out-of-phase radiation from the transmission source 301.

The in-phase radiation can be defined by a first Fresnel zone region 305 and a third Fresnel zone region 311, and the out-of-phase radiation can be defined by a second Fresnel zone region 306 and a fourth Fresnel zone region 312. As shown, the first Fresnel zone region 305 can bound in-phase radiation and the second Fresnel zone region 306 can bound out-of-phase radiation. Placing the Fresnel lens 100 at the predetermined distance 307 and at a predetermined angle 308 relative to a transmission or receiver source can result in gain enhancement, focusing of radiated energy from the transmission source 301, signal improvement at the receiver 302 relative to that of a communication link without the Fresnel lens 100, or any combination. This result can be accomplished, at least in part, by cancelling the out-of-phase radiation in Fresnel zone region 306. The predetermined angle 308 may be any angle whereby the Fresnel lens 100 is orthogonal to the transmission path. For example, the electrically conductive region 130 can diffract, reflect, interfere with, block, or cancel out the out-of-phase radiation in Fresnel zone 306 to enhance transmission gain and improve SNR in the communication link 300. As such, the Fresnel lens 100 does not require a direct wired connection to the transmission source 301 nor a source of power, i.e., a plug or battery, to perform gain enhancement in the communication link 300.

Figure 3:
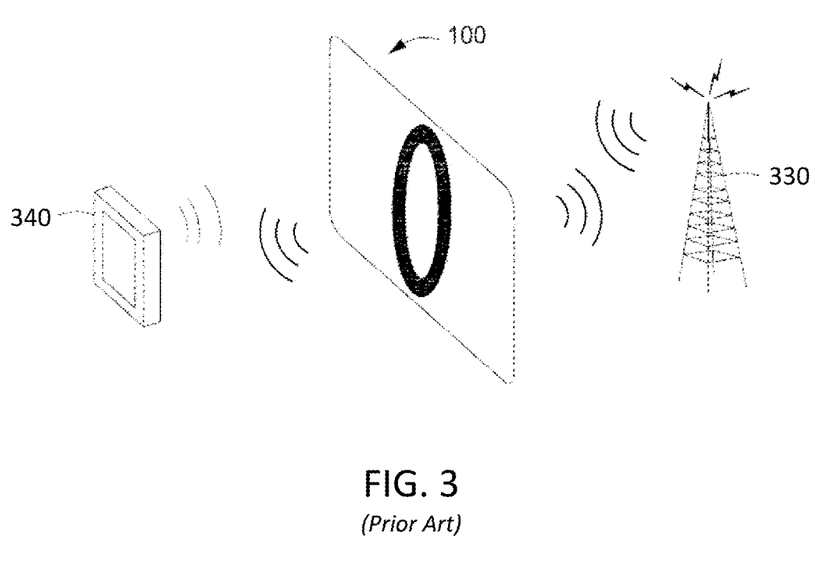
FIG. 3, labeled as prior art, depicts a schematic diagram of an illustrative wireless device utilizing the Fresnel lens depicted in FIG. 1 to enhance the gain of one or more signals sent to and from the wireless device, according to one or more embodiments described.

FIG. 3, labeled as prior art, depicts a schematic diagram of an illustrative wireless device 340 placed proximate to a Fresnel lens 100 or in a predetermined Fresnel zone region to enhance the gain of a signal transmitted from the wireless mobile device 340 (e.g., a cellular phone, smartphone, tablet, laptop, IoT device) as well as to enhance the gain of a signal received by the wireless device 1001 which has been transmitted by one or more transceivers 330 (e.g., a cell phone tower, a wireless router, etc.), according to one or more embodiments. As described infra, placing the Fresnel lens 100 at a predetermined distance and at a predetermined angle relative to a transmission or receiver source can result in gain enhancement, focusing of radiated energy from the transmission source, signal improvement at the receiver relative to that of a communication link without the Fresnel lens, or any combination. FIG. 7 also illustrates the distinction that the Fresnel lens 100 is not an antenna. Antennas are operably integrated on the one or more wireless mobile devices 340 and the one or more transceivers 330. FIG. 3 also illustrates the fact that no direct wire connection(s) are required between the Fresnel lens 100 and the one or more wireless devices 340. The Fresnel lens 100 can be used to enhance the signal gain of one or more wireless devices 340 transmitted to one or more transceivers 330. Further, the Fresnel lens 100 can be used to enhance the signal gain of one or more transceivers 330 transmitted to one or more wireless devices 340. The wireless devices 340 can include, but are not limited to, mobile phones, smartphones, tablet devices, personal digital assistants (PDA), cameras, global positioning systems (GPS), wireless adapters or PCI cards for computing devices (e.g., Bluetooth® or 802.11 devices), radios, transmitters, Internet of Things (IoT) devices, or any combination thereof.

As mentioned in the description with respect to FIG. 2, placing the Fresnel lens 100 at the predetermined distance 307 and at a predetermined angle 308 relative to a transmission or receiver source can result in gain enhancement, focusing of radiated energy from the transmission source 301, signal improvement at the receiver 302 relative to that of a communication link without the Fresnel lens 100, or any combination. The predetermined angle 308 may be any angle whereby the Fresnel lens 100 is orthogonal to the transmission path. What is now needed are means to achieve optimal placement of the Fresnel lens 100 with regards to the predetermined distance and location over an antenna 460 disposed within a mobile device 340 (see FIG. 5A, e.g., a wireless communications-enabled smartphone or tablet). What is also needed are means to manipulate orientation of the Fresnel lens 100 in scenarios wherein location of the antennae varies according to the type of mobile device being used. Manipulating the orientation of the Fresnel lens 100 over, e.g., a mobile device 340 can be done by the users of a wireless devices until the user is satisfied with the signal strength being obtained by the wireless device 340 via signal enhancement provided the Fresnel lens 100.

Grips for use together with a protective case for mobile devices such as Smartphones are in wide use. An example of such grips is described in U.S. Pat. No. 11,149,902, issued Oct. 19, 2021 to David B. Barnett, which is incorporated herein by reference. Other related patents include U.S. Pat. Nos. 10,841,410 and 10,742,251, also incorporated herein by reference. The patents related to products produced and sold by Popsockets LLC, of Bolder Colorado. The grip is provided in the form of an expandable accessory for attachment to a mobile electronic device that includes a base, a collapsible membrane, and a bottom. The membrane includes a plurality of linear wall segments. The membrane is movable between a collapsed position and an expanded position, and when the membrane is in the expanded position, the plurality of linear wall segments area arranged in a common conical plane.

Figure 4:
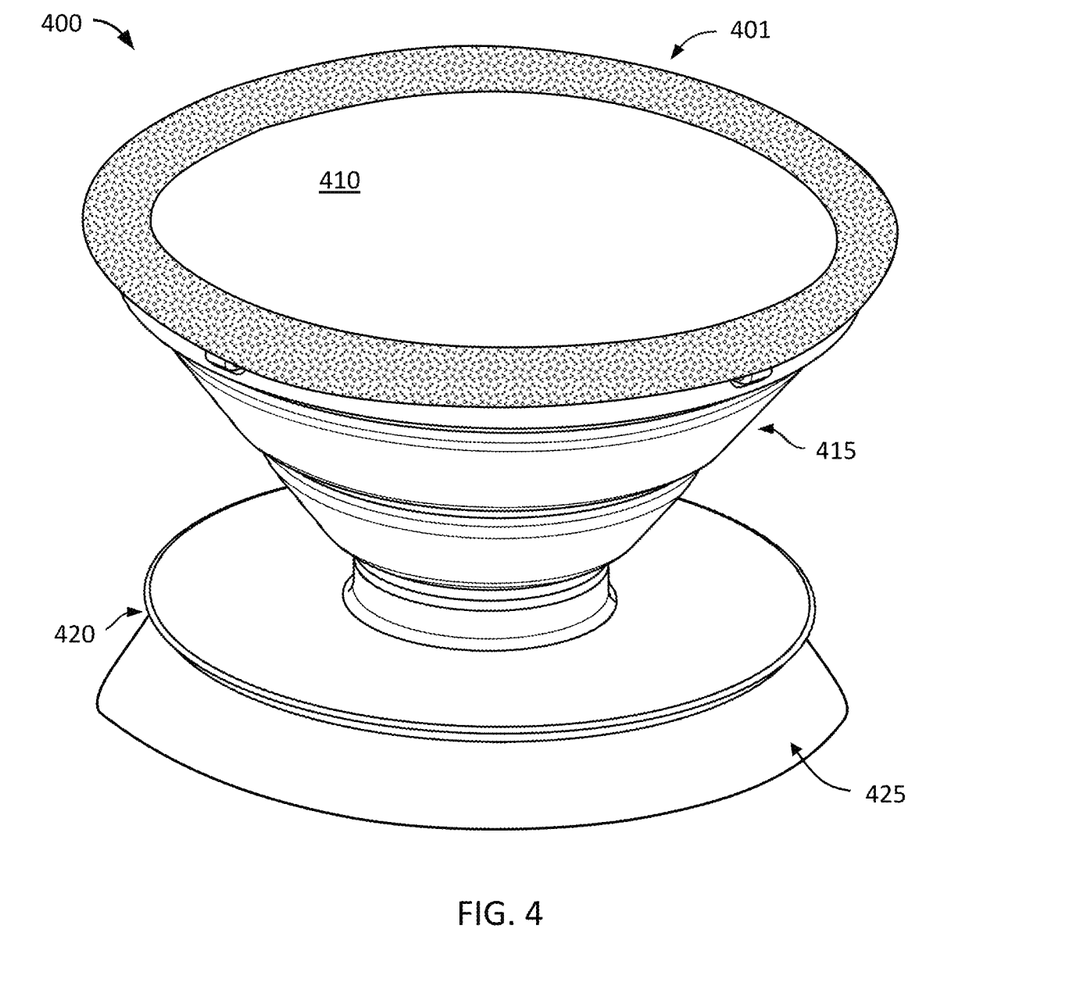
FIG. 4 depicts of an expandable grip structure that includes a Fresnel lens formed around a perimeter of a button, according to one or more embodiments described.

Referring to FIG. 4, illustrated are top front perspective view of an expandable grip structure 400 that includes a Fresnel lens 401 formed around a perimeter of a button 410, according to an embodiment. Note that Fresnel lens 401 is once again depicted in the shape of a circle and can be attached or integrated with a button 410. The button 410 of the grip structure 400 is supported by a collapsible membrane 415. A base 420 is disposed on the collapsible membrane 415 opposite the button 410 and Fresnel lens 401. The base 420 can include a suction cup 425 for attaching the expandable grip structure 400 onto the rear of a mobile device 340 (see FIG. 5A). Attachment onto the rear surface of a mobile device (which is typically flat and smooth) can be adjusted according to which location increases signal receipt of mobile device 340.

Figure 5A:
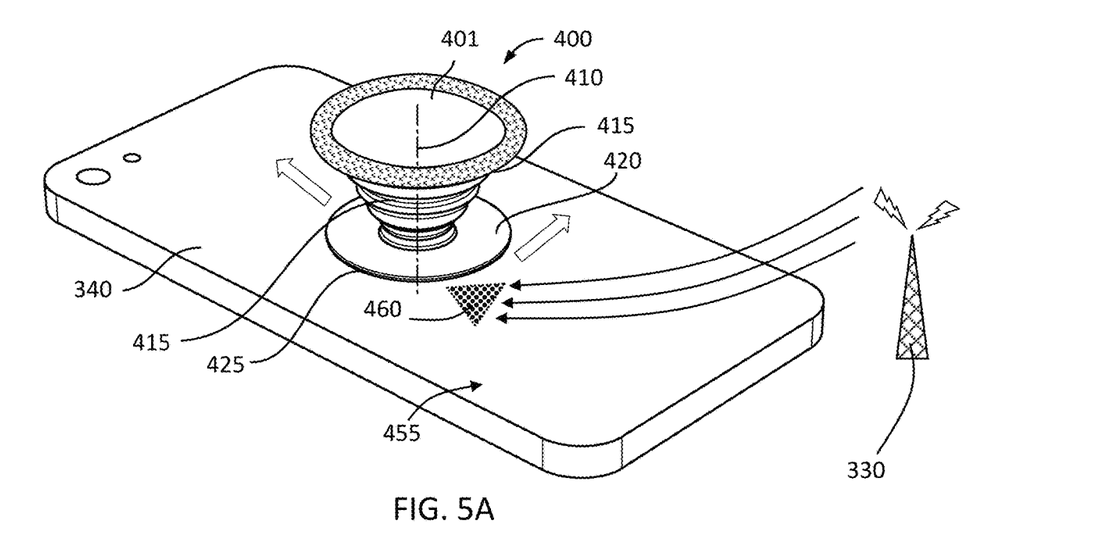
FIGS. 5A-B depicted are perspective views of a mobile device utilizing an expandable grip structure incorporating Fresnel lens technology, according to one or more embodiments described.
Figure 5B:
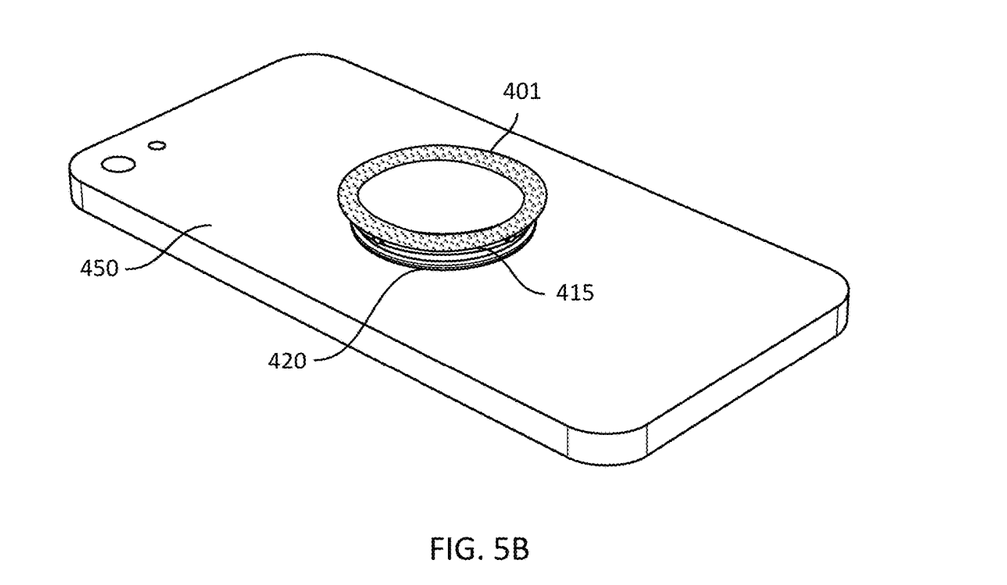

Referring to FIGS. 5A-5B, depicted are perspective views of a mobile device utilizing an expandable grip structure incorporating Fresnel lens technology. The expandable grip structure 400 is shown attached to the back surface 455 of a mobile device 340. Although the expandable grip structure 400 is shown centered on the back surface 455 of the mobile device 340, it should be appreciated that the suction cup 425 can provide flexibility in selection of a location along the back surface 455 of the mobile device 450 for placement of the grip structure 400 and the Fresnel lens 401. In circumstances where a weak signal is being experienced by the mobile device user, the grip structure 400 can be expanded at its collapsible membrane 415 by pulling outward on the button 410. If the signal has not improved, the expandable grip structure 400 can be removed and then replaced at a location over the back surface 455 that improves radio frequency signal reception of the embedded antenna 460 from remote telecommunications transceivers 330. Once the best location is found, the grip structure 400 can once again be adhered to the back surface 455 by pressing down on the suction cup 415 at the base 420. A combination of expanding the collapsible membrane 415 and movement of the expandable grip structure 400 can provide the best signal strength from remote data transmitters 330 via movement of the Fresnel lens 401 (as illustrated by the two arrows near the expandable grip structure 400) and its location with respect to the internal antennae 460 that would typically be located within the mobile device 450.

Figure 6A:
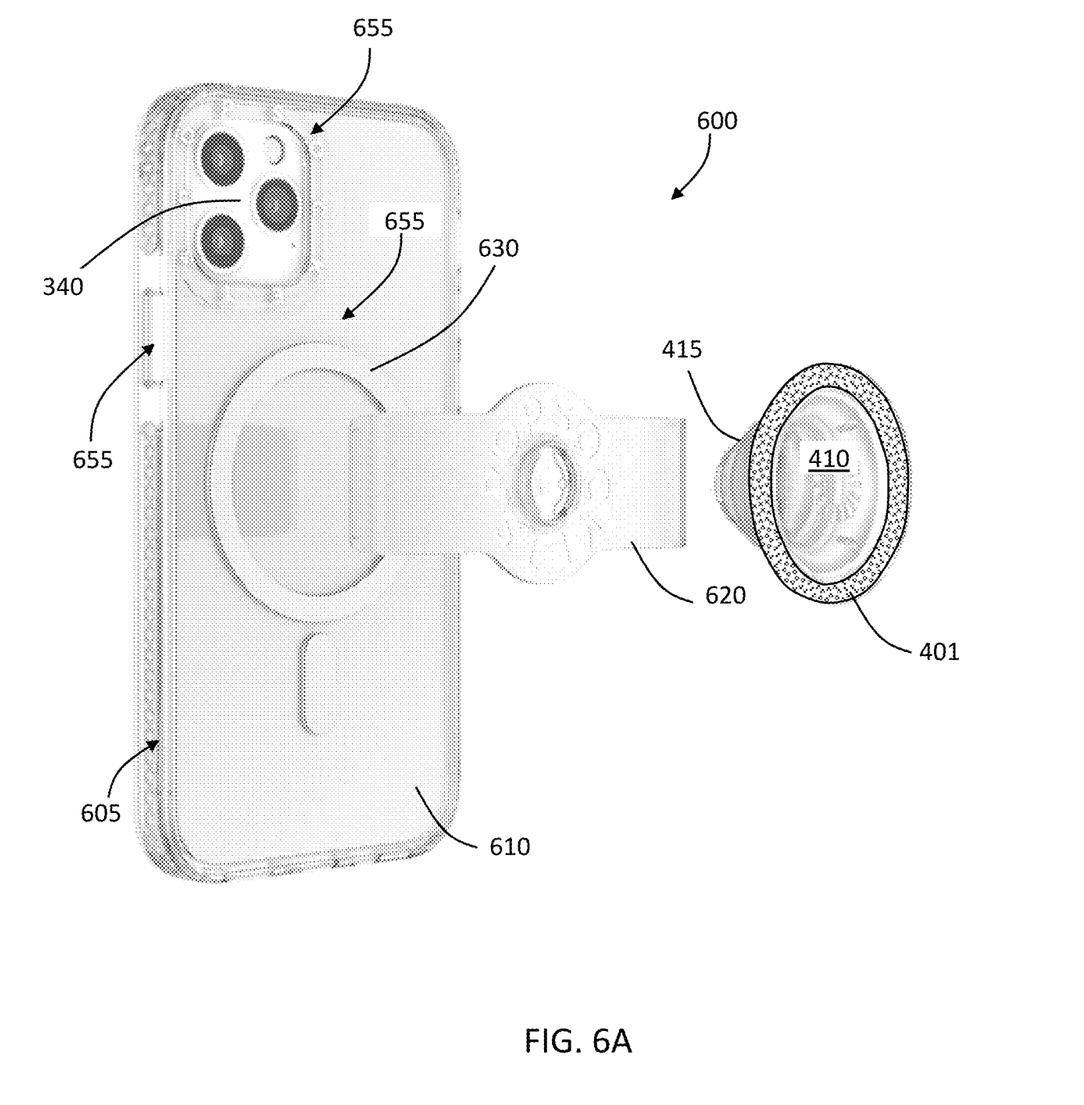
FIGS. 6A-C depicted are back left (FIG. 6A, FIG. 6B) and back right (FIG. 6C) perspectives of a mobile phone case and grip system incorporating Fresnel Lens technology, according to one or more embodiments described.
Figure 6B:
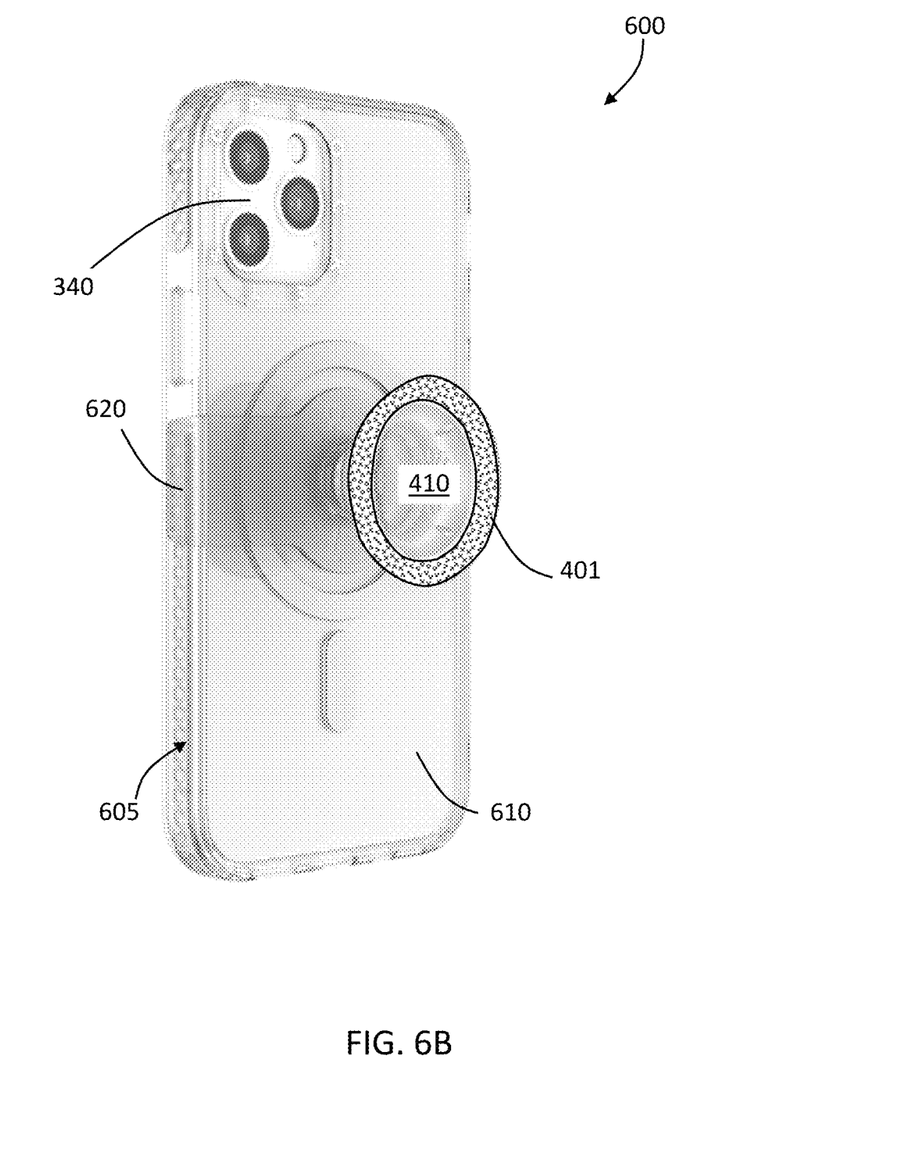
Figure 6C:
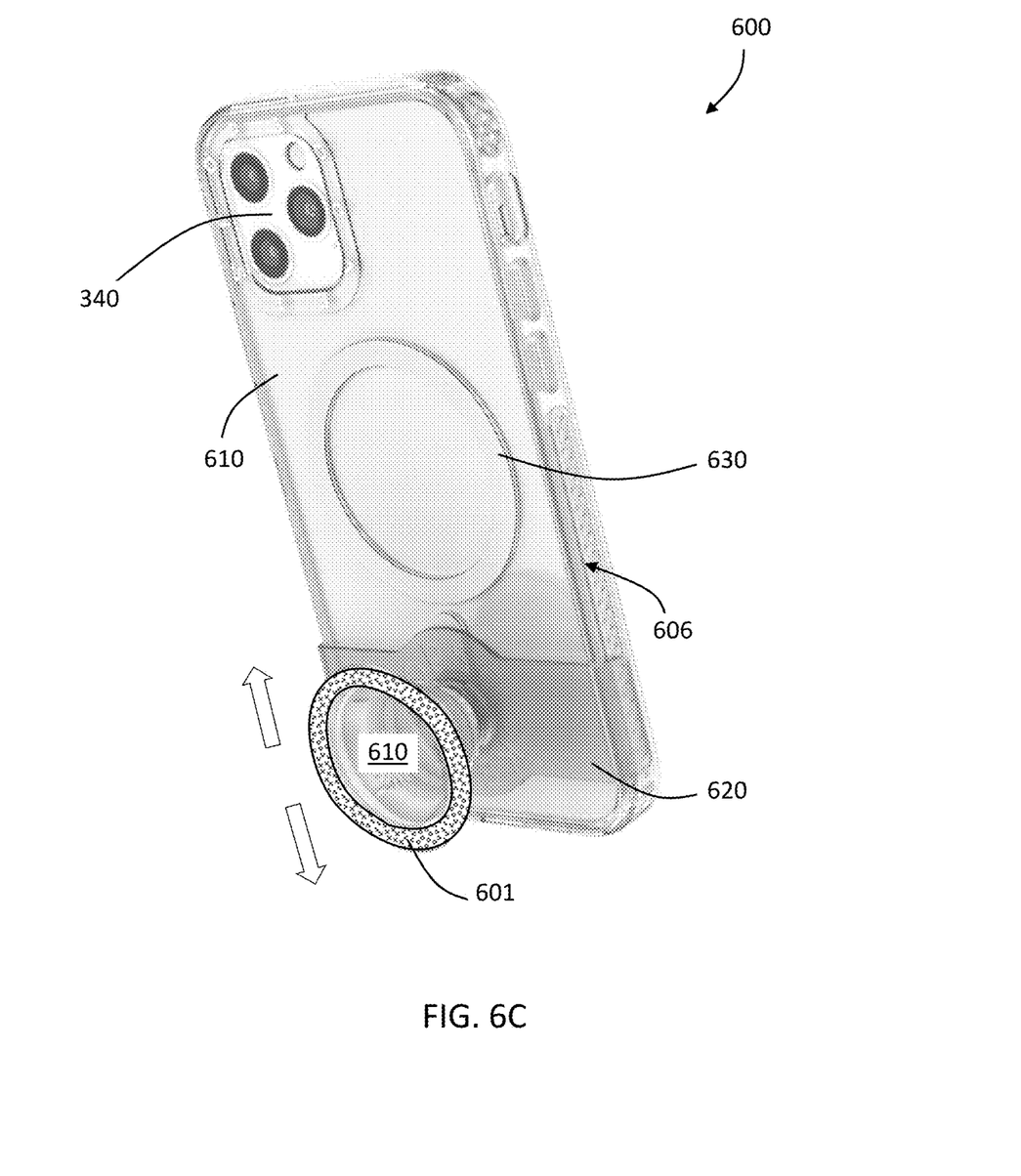

Referring to FIGS. 6A-6C, depicted are back left (FIG. 6A, FIG. 6B) and back right (FIG. 6C) perspectives of a mobile phone case and grip system 600 incorporating Fresnel Lens 401 technology, in accordance with another embodiment. A protective case 610 can be provided to enclose the back surface and sides of a mobile device 340. The protective case 610 can be provided in a plastic material and can incorporate a magnetically attached wireless power transfer module 630 embedded therein on its back surface. The protective case can also include appropriate access portals 650 for cameras and buttons typically found on many mobile devices. A slidable clip structure 620 can also be provided for clip and slide attachment to the protective case 610 at slots 605 and 606 formed at the sides of the protective case 610. The collapsible membrane 415 opposite button 410 and Fresnel lens 401 described as part of the expandable grip structure 400 described in FIGS. 5A-5B can attached to the slidable clip structure 620. Not needed in this embodiment would be a suction cup 425 formed at a base 420. Instead, the end of the collapsible membrane 415 (where base 420 shown in FIG. 5A would be attached) can be directly attached to the slidable clip structure 620, with the slidable clip structure 620 now serving as the "base". However, this configuration enables a user to manipulate the slidable clip structure 620 up and down along the protective case 610 within slots 605 and 606 to achieve best placement of the Fresnel lens 401 over the back surface of the mobile device 340 in order to optimize radio frequency receipt by the embedded antenna 460. The button 410 also continues to serve as a handle (or grip) for holding the mobile device 340. Additionally, the slidable grip can also be slid out of the way of the of the wireless power transfer module 630 when it must be accessed and used to recharge the mobile device. It may be preferred that slots 605 and 606 be formed along the entire side of the protective case 610 in order to provide additional movement of the Fresnel lens 401 along the back surface 655 of the protective case 610 (and mobile device) for optimum RF signal receipt.

Referring to FIG. 7, illustrated is a Fresnel lens 401 for attachment to a button 410 integrated with a collapsible membrane 415. It should be appreciated that the Fresnel lens 401 can be adhered to an outer surface 417 and perimeter 417 of the button 410 using an adhesive 419 formed or placed on the backside of the Fresnel lens 401, thereby creating an adhesive backside 419. The adhesive backside 419 (not shown) can be provided as part of the Fresnel lens 401 (e.g., on its back surface, like a sticker). What is important is that the Fresnel lens 401 be made of material described herein that can enhance RF signal receipt by mobile devices. Providing the Fresnel lens in a configuration similar to a sticker can allow Fresnel lens technology as described herein to be utilized on various after market or already existing grip designs.

Referring to FIG. 8, the Fresnel lens 401 can also be provided with a carrier 810 that can be temporarily attached to grip structures 400 for the purpose of improving RF signal gain. Attachment can be achieved by adhesive, clips, for plastic formations that enable the carrier (and Fresnel lens 401) to be held onto the outer surface 417 of the button associated with a grip structure 400. The carrier 810 can be of a larger size (diameter) than a button on an existing grip button thereby also enabling the Fresnel lens 401 to be larger in overall size than the button. It should also be appreciated that a collapsible membrane 415 can be provided that is longer 416 when deployed than currently existing grip structures provide. This would allow for more distance from the mobile device, which can also enhance signal gain when adjusted.

Certain embodiments and features have been described using a set of numerical upper limits and a set of numerical lower limits. It should be appreciated that ranges from any lower limit to any upper limit are contemplated unless otherwise indicated. Certain lower limits, upper limits, and ranges appear in one or more claims below. All numerical values are "about" or "approximately" the indicated value, and take into account experimental error and variations that would be expected by a person having ordinary skill in the art. As used herein in the claim(s), when used in conjunction with the word "comprising", the words "a" or "an" mean one or more.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

The invention claimed is:

1. A Fresnel lens-enhanced expandable grip structure for use with mobile devices, comprising:
   a collapsible membrane, wherein the collapsible membrane form into a conical shaped when expanded from a flat position to an expanded position;
   a button formed at one end of the collapsible membrane, the button having an outer perimeter and a surface;
   a base formed at a second end of the collapsible membrane; and
   a Fresnel lens disposed on the outer perimeter and surface of the button;
   wherein the base can be moved along and attached to a backside of a mobile device and the collapsible membrane expanded to enable the Fresnel lens to enhance radio frequency reception by the mobile device.

2. The Fresnel lens-enhanced expandable grip structure of claim 1, further comprising a suction cup attached to an outer surface of the base, said suction cup adapted for attachment to the back surface of the mobile device to thereby affix the Fresnel lens at select locations over the back surface of the mobile device.

3. The Fresnel lens-enhanced expandable grip structure of claim 1, wherein said base further comprises a slidable clip, said slidable clip adapted to attach to and slide along slots formed in sides of a mobile device protective cover to thereby move the Fresnel lens over the back surface of the mobile device.

4. The Fresnel lens-enhanced expandable grip structure of claim 1, wherein the Fresnel lens further comprising an adhesive backside, said adhesive backside adapted to attached the Fresnel lens to a surface of the button.

5. The Fresnel lens-enhanced expandable grip structure of claim 1, wherein the Fresnel lens further comprises a carrier, said carrier adapted to attach to at least one of the button or expandable membrane.

6. The Fresnel lens-enhanced expandable grip structure of claim 1, wherein a combination of expanding the collapsible membrane and movement of the expandable grip structure and the Fresnel lens along the surface of the provides improved signal reception from transceivers with respect to an internal antenna associated with the mobile device.

7. A Fresnel lens for use with mobile devices, comprising a Fresnel lens adapted with at least one of an adhesive or a carrier, wherein the Fresnel lens is adapted to be attached to at least one of an outer perimeter and surface of a button associated with a collapsible membrane adapted to be moved along and attached to a backside of a mobile device and the collapsible membrane further adapted to be expanded to enable the Fresnel lens to enhance radio frequency reception by the mobile device.

8. The Fresnel lens of claim 7, further comprising a base attached to the collapsible membrane opposite the button, said base including a suction cup attached to an outer surface of the base, said suction cup adapted for attachment to the back surface of the mobile device to thereby affix the Fresnel lens at select locations over the back surface of the mobile device.

9. The Fresnel lens of claim 7, further comprising a base attached to the collapsible membrane opposite the button, said base further comprises a slidable clip, said slidable clip adapted to attach to and slide along slots formed in sides of a mobile device protective cover to thereby move the Fresnel lens over the back surface of the mobile device.

10. The Fresnel lens of claim 7, wherein the Fresnel lens further comprises an adhesive backside, said adhesive backside adapted to attach the Fresnel lens to a surface of the button.

11. The Fresnel lens of claim 7, wherein said carrier is adapted to attach to at least one of the button or expandable membrane.

12. The Fresnel lens of claim 7, wherein a combination of expanding the collapsible membrane and movement of the expandable grip structure and the Fresnel lens along the surface of the provides improved signal reception from transceivers with respect to an internal antenna associated with the mobile device.

13. A method for improving radio frequency reception by mobile devices, comprising:
   providing a Fresnel lens adapted to be attached to a button associated with an expandable grip structure, wherein the expandable grip structure includes a collapsible membrane formable into a conical shaped when expanded from a flat position to an expanded position, the button formed at one end of the collapsible membrane and having an outer perimeter and a surface, and a base formed at a second end of the collapsible membrane;
   expanding the collapsible membrane and moving the base along a back surface of a mobile device to a location on the back surface that enables the Fresnel lens to enhance radio frequency reception by the mobile device.

14. The method of claim 13, further comprising the step of attaching the base to the back surface of the mobile device with a suction cup provided on an outer surface of the base once enhanced radio frequency reception is achieved by the Fresnel lens.

15. The method of claim 13, wherein the base is provided in the form of a clip configured to slidably attach to grooves formed in a protective case and to slide along the back surface of the mobile device, wherein the base is moved along the back surface by sliding the clip, and thereby the collapsible membrane, button and Fresnel lens, along the back surface of the mobile device.

* * * * *